Sept 1, 1925.　　　　　　　　　　　　　　1,552,339
J. NICCHIA
BAIL HOLDING DEVICE
Filed Aug. 23, 1924
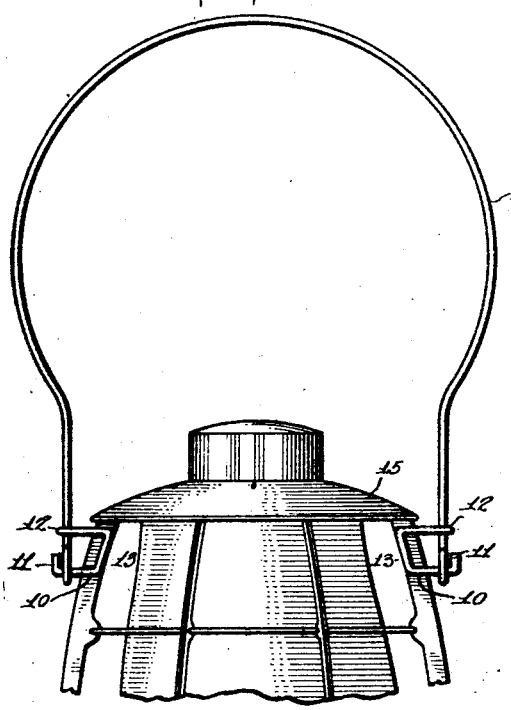
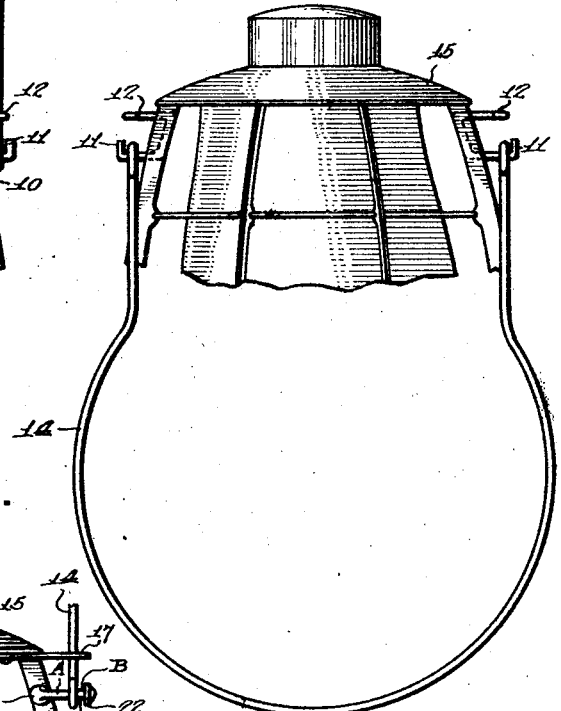
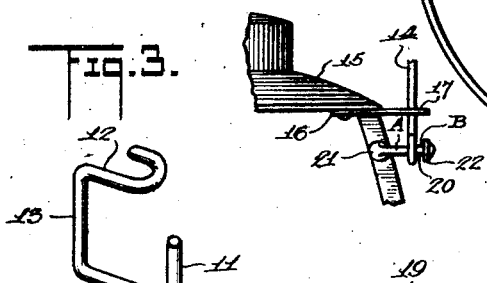
INVENTOR
JOSEPH NICCHIA.
BY
Harold O. Penney ATTORNEY Patented Sept. 1, 1925.

1,552,339

UNITED STATES PATENT OFFICE.

JOSEPH NICCHIA, OF NEW YORK, N. Y.

BAIL-HOLDING DEVICE.

Application filed August 23, 1924. Serial No. 733,759.

*To all whom it may concern:*

Be it known that I, JOSEPH NICCHIA, citizen of the United States, and resident of New York, in the county of New York and State of New York, have invented certain new and useful Improvements in Bail-Holding Devices, of which the following is a specification.

The present invention relates to locks or clips for the bails of lanterns, and one object of the invention is to provide a lock or clip by which the bail is permitted to swing or pivot on the lantern when desirable and by which the bail can be rigidly connected to the lantern for supporting the lantern in fixed relation to the bail and particularly useful when the lantern is swung for signalling.

Another object is to provide a lock or clip which is simple, inexpensive to manufacture and is readily secured to the lantern, pail, or similar device.

I attain these objects by the invention one of the possible embodiments of which is described in the subjoined specification and shown in the accompanying drawing, in which Fig. 1 is a rear view showing the bail supported by the clip and maintained thereby in rigid position on a lantern.

Fig. 2 is a front view showing the bail supported on the lantern by the clip and in pivotal or swinging position.

Fig. 3 is a detail view of the clip removed from the lantern.

Fig. 4 is a fragmentary side view of a modified device, and

Fig. 5 is a detail view of part of said modification.

Similar reference characters denote similar parts throughout the several views.

Referring to Fig. 3, the clip is of wire of suitable thickness, bent to form the straight portion 10, having the substantially right angled upwardly extending end 11, and the overlying hook member 12 consisting of a shank and a curved inwardly open hook, the straight portion 10 and the hook member 12 being connected by the back 13, the clip for operable purposes being secured to the lantern near the top thereof by soldering or otherwise suitably fastening the back 13 to the frame or other suitable portion of the lantern, the back, as shown in Figs. 1 and 2, being secured to a longitudinal rib of the frame of the lantern, the hook of the member 12 overlying the end 11 and being in a plane transverse to the plane of the end 11 and spaced away somewhat from said end.

The bail portion 14 is of spring wire having relatively straight end portions which are bent to form loops 15 which when the bail is operatively connected to the clips are passed over the ends 11 thereof and are slidably movable on the straight portions 10, the relatively straight end portions of the bail being receivable in the openings of the hooks of the members 12 and the loops 15 bearing against the ends 11 of the clips and retained in this position by the resiliency of the bail for maintaining the bail and lantern in rigidly connected relation as shown in Fig. 1. By compressing the bail at its ends the bail is disengageable from the hook members 12 and the loops 15 are slidably moved inwardly on the straight portions 10 thereby permitting swinging or pivotal movement of the bail on the straight portions 10 as shown in Fig. 2.

While the clip shown in Fig. 3 provides a cheaply manufactured and efficient clip which may be secured to any form of lantern suitable for its attachment thereto and which has a resilient bail provided with end loops, I do not limit myself to the clip shown in Fig. 3, because as may be readily understood, the back 13 may be eliminated, the clip then consisting of a straight portion 10 and an upstanding end 11 separate from the hook member 12, the straight portion 10 being suitably secured to the lantern near the top thereof and the shank of the hook member 12 being suitably secured to the lantern in overlying spaced relation to the straight portion 10 and its upstanding end 11 for cooperating with the bail as described relative to the first form of clip.

Fig. 4 shows a fragmentary view of a lantern with a modified form of bail-holding means in which, instead of attaching the bail-holding portion of one of the side frames as shown in Figs. 1 and 2, I have arranged to attach it to the upper or cap portion 15 of the lantern on the underneath side thereof as at 16 by riveting, soldering or any other suitable means and this modified bail-holding means may be made of a flat stamped out piece of sheet metal of the general contour shown in Fig. 5 and generally denoted by 17. This modified piece 17 is provided with a bayonet slot 18 in which the bail 14 is permitted to engage in substantially the same manner as described for a preferred form for Figs. 1 and 2. The flange portion 19 thereof may be provided with rivet holes and is of a curved contour so as to substantially fit and be maintained by the cap portion 15.

As an equivalent of the pintle portion 10 and 12 of the preferred form, a separate shaft 20 is provided upon which the bail is pivoted, this being spot or otherwise welded or soldered on the guard, as at 21, and being provided at its outer end with a restraining collar 22 to provide sufficient space at A and B on the spindle 20 whereby to permit a side-wise engaging or disengaging action of the bail.

Having thus described my invention it should be understood that there may be modifications thereof and variations therein without departing from the spirit of the invention, or exceeding the scope of the appended claims.

In the preferred form of construction, however, as shown in Figs. 1 to 3, inclusive, a greater economy is accomplished, owing to the bail lock portion 12 and the pivot portion 10 being integral by reason of the joining portion 13, and the complete combination of these in one piece, obviates the handling of a plural number of pieces and permits greater speed and economy in assembly to the lantern portion.

What I claim and desire to protect by Letters Patent is:

1. The combination with a lantern having a bail or resilient material provided with loops on its free ends, of a clip comprising a straight portion having an upstanding imperforate end receivable in a loop of the bail, a hook member, and means for securing said straight portion and hook member to the lantern in spaced relation to each other, the hook member overlying said straight portion and the hook of said member being in a plane transverse to the plane of said end of the straight portion and spaced away somewhat from said end.

2. A clip for an article having a bail with loops at its free ends, said clip consisting of a straight portion having an upstanding end substantially at right angles thereto, a hook member, and means for securing said straight portion and hook member to the article in cooperating relation, the hook member when said member and straight portion are in cooperating relation overlying the straight portion and the hook of said member being in a plane transverse to said end and spaced away from said end, the plane of said end passing outwardly relative to the outer end of the hook member.

3. The combination with an article having a bail of resilient material provided with loops at its free ends, of a clip consisting of a straight portion having an upstanding end substantially at right angles thereto, a hook member, and means for securing said straight portion and hook member to the article in cooperating relation, the hook member when said member and straight portion are in cooperating relation overlying the straight portion and the hook of said member being in a plane transverse to said end and spaced away from said end, the plane of said end passing outwardly relative to the outer end of the hook member, the bail being received in said hook and said upstanding end being received in a loop of the bail and the loop being movable on said straight portion and bearing against said end.

4. The combination with a lantern having a bail of resilient material provided with loops on its free ends, of a clip comprising a straight portion having an upstanding end, a hook member consisting of a shank and a curved inwardly open hook, and means for securing the straight portion and shank to the lantern in spaced relation to each other, the hook member overlying said straight portion and the hook of said member being in a plane transverse to the plane of the upstanding end of said straight portion and spaced away somewhat from said end, the end portion of said bail being receivable in said hook and a loop of the bail slidably movable on said straight portion and bearing against the upstanding end thereof.

5. As an article of manufacture and sale a clip comprising a straight portion having an upstanding imperforate end substantially at right angles to the straight portion, a hook member, and means for securing said straight portion and hook member to a lantern in spaced relation to each other, the hook of the hook member overlying said straight portion and said hook being in a plane transverse to the plane of the upstanding end of the straight portion and spaced somewhat away from said end.

6. As an article of manufacture and sale a clip of suitable material bent to form as integral parts a straight portion having an upstanding end, a hook member consisting of a shank and a curved inwardly open hook, and a back connecting said straight portion and hooked member in spaced relation to each other, the hook member overlying said straight portion and said hook being in a plane transverse to the plane of said upstanding end of the straight portion and spaced away somewhat from said end.

Signed at New York, in the county of New York and State of New York, this 11th day of August, A. D. 1924.

JOSEPH NICCHIA.